(12) United States Patent
Schwarz

(10) Patent No.: US 6,355,697 B2
(45) Date of Patent: Mar. 12, 2002

(54) PROCESSES FOR FORMING STYRENIC POLYMERS

(75) Inventor: Richard Anton Schwarz, Colleyville, TX (US)

(73) Assignee: StyroChem Delaware, Inc., Wilmington, DE (US)

( * ) Notice: Subject to any disclaimer, the term of this patent is extended or adjusted under 35 U.S.C. 154(b) by 0 days.

(21) Appl. No.: 09/828,608

(22) Filed: Apr. 6, 2001

Related U.S. Application Data

(63) Continuation-in-part of application No. 09/473,606, filed on Dec. 29, 1999.

(51) Int. Cl.[7] .............................. C08J 9/18; C08J 9/20
(52) U.S. Cl. ........................................ 521/56; 521/60
(58) Field of Search ...................... 521/56, 60

(56) References Cited

U.S. PATENT DOCUMENTS

| | | | |
|---|---|---|---|
| 2,673,194 A | | 3/1954 | Grim |
| 3,932,986 A | | 1/1976 | Kosaka et al. |
| 4,085,169 A | | 4/1978 | Saito et al. |
| 4,091,054 A | | 5/1978 | Saito et al. |
| 4,169,193 A | | 9/1979 | Biglione et al. |
| 4,169,828 A | | 10/1979 | Wright |
| 4,173,688 A | * | 11/1979 | Saito et al. .................. 521/56 |
| 4,183,993 A | | 1/1980 | Benstead et al. |
| 4,333,969 A | | 6/1982 | Wright et al. |
| 4,363,881 A | * | 12/1982 | Smith .......................... 521/56 |
| 4,385,156 A | * | 5/1983 | Ingram et al. ................ 521/56 |
| 4,581,275 A | | 4/1986 | Endo et al. |
| 4,582,859 A | * | 4/1986 | Lein, Jr. et al. ............... 521/56 |
| 4,675,363 A | * | 6/1987 | DiGiulio ...................... 521/56 |
| 5,128,380 A | * | 7/1992 | Ueda et al. ................... 521/56 |
| 5,132,330 A | * | 7/1992 | Spielkamp et al. ........... 521/56 |
| 5,147,937 A | | 9/1992 | Frazza et al. |
| 5,240,967 A | * | 8/1993 | Sonnenberg et al. .......... 521/56 |
| 5,935,645 A | | 8/1999 | Anfuso et al. |

OTHER PUBLICATIONS

Kurt C. Frisch and James H. Saunders, Plastic Foams in Two Parts, Part II, Subject Index pp. 1019 and 1018 and p. 538, 1979 Mercel Dekker, Inc., New York, NY.

* cited by examiner

*Primary Examiner*—Morton Foelak
(74) *Attorney, Agent, or Firm*—Duane Morris & Heckscher LLP

(57) ABSTRACT

Polymers are formed by suspension polymerization of monomers, including one or more styrenic monomers, in the presence of polymeric, emulsion based seeds. The polymerization can be carried out in the presence of one or more blowing agents, producing polymers that can be expanded. The methods are useful, for example, in forming polystyrene which can then be expanded to form expanded polystyrene. The methods utilize suspending agents, and surfactant can be used in an amount insufficient to form an emulsion.

17 Claims, No Drawings

PROCESSES FOR FORMING STYRENIC POLYMERS

This application is a continuation-in-part of Ser. No. 09/473,606, filed Dec. 29, 1999.

FIELD OF THE INVENTION

The present invention is directed to processes for impregnating emulsion based seeds.

In particular, the present invention is directed to processes for impregnating emulsion based seeds while minimizing the formation of polymeric, emulsion based seeds having undesirably small sizes.

BACKGROUND OF THE INVENTION

Styrenic polymers have a wide variety of applications, including the formation of expanded polystyrene which can be used to make a variety of products. Processes for forming styrenic polymers include emulsion polymerization, suspension polymerization, and the use of particular suspension or emulsion aids. Attempts have been made to reduce the production of styrenic polymeric particles having undesirably small sizes, referred to as "fines".

For example, U.S. Pat. No. 4,091,054 discloses a suspension polymerization process for the formation of polystyrene particles. The method uses a polymerization catalyst solution formed by dissolving 60 to 100 weight percent of the total polymerization catalyst to be used in 1 to 10 weight percent of the total styrenic monomer, and a monomer solution containing 90 to 99 weight percent of the total styrenic monomer and the remaining 0 to 40 weight percent polymerization catalyst. The two solutions are added separately, dropwise, to a suspension of smaller styrenic polymer particles, having sizes less than the desired final size, and the monomer polymerizes with the smaller particles to form the desired particles. While the '054 patent discloses that particle sizes in the range 0.6 to 2.5 mm can be obtained, the dropwise addition that is a critical feature of the process can result in undesirably long reaction times.

U.S. Pat. No. 4,333,969 discloses an emulsion polymerization process that uses an aqueous emulsion containing styrenic monomer, a polymerization catalyst, and a nonionic surfactant that is an ethylene oxide condensate of an alkylphenol. The surfactant contains at least 50 moles of ethylene oxide per mole of alkylphenol. The emulsion is added to an aqueous suspension of styrenic polymer beads and the monomer polymerizes to form larger styrenic polymer particles. The patent discloses that polymeric beads of a predictable size can be formed. However, emulsion processes often require larger reaction vessels due to the high volumes of water that are generally used. Also, the required dispersion aids and/or surfactants can result in increased costs and handling for emulsion processes as compared with solution or suspension processes.

Polymer beads are useful in applications such as the formation of expanded resins, for example, expanded polystyrene. Expanded polystrene and other expanded resins can be prepared from expandable polymeric beads made by contacting the polymeric beads with a volatile compound known as a "blowing agent" or "expanding agent". Such agents include aliphatic hydrocarbons such as butane, heptane, pentanes, and halogenated hydrocarbons such as trichlorofluoromethane, trichlorofluoromethane, and methyl chloride. The beads in contact with the expanding agent may be expanded by heating, or by exposure to reduced pressure as in a vacuum. The size and size distribution of the expanded beads will depend upon the size and size distribution of the expandable beads.

A need remains for new and/or improved processes for impregnating emulsion based seeds. A further need remains for processes that provide styrenic polymers having desirable particle size distributions and reduced production of fines.

SUMMARY OF THE INVENTION

One aspect of the present invention is a method for impregnating emulsion based seeds. The method includes providing polymeric, emulsion based seeds in an aqueous medium; combining with the polymeric, emulsion based seeds, in the aqueous medium, a suspending agent and one or more surfactants in a ratio of about 1:175 or less to the weight of suspending agent, to form a seed suspension; forming about 100 to about 2500 weight percent, based on the weight of the emulsion based seeds in the seed suspension, of a reaction mixture including styrene and one or more initiators; combining the reaction mixture with the seed suspension to form a polymerization mixture; and heating the polymerization mixture in the presence of a blowing agent to a polymerization temperature to effect formation of expandable polystyrene.

Another aspect of the invention is a method for forming a styrenic polymer, comprising providing polymeric seeds in an aqueous medium; combining batchwise the polymeric seeds in the aqueous medium with from 0 to about 250 weight percent, based on the weight of the seeds, of a pre-swell mixture of styrene and one or more initiators; combining the pre-swell mixture having the polymeric seeds in aqueous medium therein with a reaction mixture containing one or more initiators and from about 100 to about 2500 weight percent styrene based on the weight of the seeds, to form a polymerization mixture; and heating the polymerization mixture in the presence of a blowing agent to a polymerization temperature to effect formation of the styrenic polymer.

These and other aspects of the invention will become apparent to those skilled in the art in view of the following disclosure and the appended claims.

DETAILED DESCRIPTION OF THE INVENTION

The present invention provides processes for forming expandable styrenic polymers. Small polymer particles, referred to as "seeds", are used in processes of the present invention. The processes can be used to form polymeric styrenic particles having narrower size distributions than are obtained using some conventional processes. Furthermore, it has been surprisingly discovered that desirable particle size distributions can be achieved by polymerization of monomers in the presence of emulsion-based polymer seeds without the use of emulsion polymerization processes.

Styrenic monomers are polymerized in the presence of the seeds, whereby a styrenic polymer is formed, in which the seeds are incorporated. By "small", as used herein to refer to the size of the seeds, is meant a size significantly smaller than the particle size of the styrenic polymer that is to be formed as an end product. Preferably, the seeds have average diameters of about 1200 microns or less, typically about 1100 microns or less, more typically about 1000 microns or less, and frequently about 900 microns or less. Also preferably, the seeds have average diameters of at least about 100 microns, typically at least about 120 microns, more typically at least about 140 microns, more typically at least about 150 microns, and frequently at least about 200 microns. The size of the seeds can be selected based, in part, upon the desired particle size for the final polymer product. "Final polymer product" and "final product", as used herein, mean a polymer that is obtained as a result of the processes of the present invention whereby styrenic monomers are polymerized in the presence of polymeric seeds. The size of polymeric particles in the final product will depend upon the intended application for the polymer. Generally, final polymer products will be formed having average diameters of at least about 200 microns, typically at least about 225 microns, more typically at least about 250 microns, even more typically at least about 275 microns, frequently at least about 300 microns, and in some preferred embodiments at least about 350 microns. Also, generally the average diameter of the final polymer product particles is about 1500 microns or less, typically about 1400 microns or less, more typically about 1300 microns or less, frequently about 1200 microns or less, and in some preferred embodiments about 1100 microns or less.

It is preferred that the size distribution of seeds be relatively narrow, in order to avoid an undesirably broad size distribution of particle sizes in final product. Generally, it is preferred that the ratio of standard deviation of mean seed size to the mean seed size be about 0.20 or less, more preferably about 0.1 or less.

The seeds may be of the same composition as or a different composition from the styrenic polymer formed using the seeds. Also, the seeds may be homopolymers or copolymers. Monomers that can be used in forming copolymer seeds include styrene, alpha-methyl styrene, para-methyl styrene, para-t-butyl styrene, monochlorostyrene, and dichlorostyrene. In preferred embodiments, the seeds comprise, as polymerized units, at least about 50% styrene, more preferably at least about 70% styrene, even more preferably at least about 80% styrene, still more preferably at least about 90% styrene, and still even more preferably at least about 95% styrene. In certain highly preferred embodiments, the seeds comprise about 98% styrene or more. However, seeds formed from more than about 50% non-styrenic monomers are within the scope of the invention, and may be preferred in some embodiments. In some embodiments, the seeds can comprise, as polymerized units, about 60, 70, 80, 90% or more non-styrenic monomers. Non-styrenic monomers that can be used in forming seeds include acrylic and methacrylic esters such as, for example, methyl acrylate, ethyl acrylate, butyl acrylate, methyl methacrylate, ethyl methacrylate; acrylonitrile; ethylene; propylene; and vinyl monomers such as divinyl benzene.

Polymeric seeds can be prepared using methods known in the art, such as conventional emulsion or suspension polymerization methods, such as those disclosed in Odian, *Principles of Polymerization*, pp. 319–339 and pp. 287–288, John Wiley & Sons, Inc. (1982); or methods disclosed in U.S. Pat. Nos. 4,336,173; 4,459,378; and 2,673,194. The disclosures of each of the patents and publications referred to herein are hereby incorporated by reference in their entirety.

Commercially available emulsion-based, polystyrene seeds, such as those available from Dyno Industrier ASA, Norway, under the name Dypro™, are also useful in the methods and compositions described herein.

For forming a final product, the seeds are provided in the form of an aqueous dispersion. The amount of seeds is generally at least about 1 weight percent, typically at least about 3 percent, more typically at least about 4 weight percent, based on the total weight of the aqueous dispersion. Also, generally the amount of seeds is about 50 weight percent or less, typically about 45 weight percent or less, more typically about 40 weight percent or less, even more typically about 35 weight percent or less, and frequently about 25 weight percent or less, based on the total weight of the aqueous dispersion. The amount of seeds in the dispersion is not critical and will depend on a number of factors such as cost of buying or preparing the seeds, and the intended use for the resulting product. Thus, dispersions of which about 10, 20, or 30 weight percent are seeds are within the scope of the invention.

In addition to the seeds, the dispersion also contains water, a suspending agent, and a surfactant. The order of placing seeds, suspending agent, and surfactant into the water is not critical. Thus, for example, the suspending agent and surfactant can be added to water that contains the seeds, or the seeds can be added to water containing suspending agent and surfactant. Preferred suspending agents are inorganic salts such as phosphates, having minimal to moderate water solubility. Exemplary suitable suspending agents are described in U.S. Pat. No. 2,673,194, the disclosure of which is hereby incorporated herein in its entirety. Preferred suspending agents include tricalcium phosphate, hydroxyapatite, and magnesium phosphate. Tricalcium phosphate is highly preferred. The amount of suspending agent is typically at least about 0.3 weight percent, based on the total weight of the dispersion, more typically at least about 0.4 weight percent, even more typically at least about 0.5 weight percent. The dispersion can also contain optional additives known to those skilled in the art, such as antifoaming agents. Suitable anti-foaming agents are known to those skilled in the art, and are commercially available from manufacturers including Henkel Corporation, Ambler, Pa. (under the name Foamaster) and Dow Corning Corporation, Midland, Mich.

Preferred surfactants are anionic surfactants, such as sodium dodecylbenzene sulfonate, sodium lauryl ether sulfonate and sodium laureth sulfate. Sodium dodecylbenzene sulfonate is highly preferred. The amount of surfactant required is less than that typically used in forming an emulsion, and can be determined by one skilled in the art, without undue experimentation, based upon the composition of the suspending agent. For example, when the suspending agent is tricalcium phosphate, the preferred ratio of surfactant to tricalcium phosphate is about 1:175 or less, more preferably about 1:300 or less.

The aqueous seed suspension is combined with a reaction mixture. The reaction mixture contains one or more styrenic monomers, one or more polymerization initiators, and optional additives known for use in suspension polymerization processes. Styrenic monomers that can be polymerized according to the processes of the invention include alpha-methyl styrene, para-methyl styrene, para-t-butyl styrene, monochlorostyrene, and dichlorostyrene. The styrenic monomers in the reaction mixture can be the same as or different from those polymerized in the seeds, and the ratios of monomers in the reaction mixture can be the same as or different from the ratios of polymerized monomers in the seeds. The total amount of styrenic monomers in the reaction mixture is preferably at least about 100 weight percent, more preferably at least about 200 weight percent, still more preferably at least about 300 weight percent, and even more preferably at least about 400 weight percent, based on the weight of the seeds. Considerably higher percentages of styrenic monomers have been used, such as 1000, 2000 weight percent or more.

Initiators suitable for polymerization of styrenic monomers are well known to those skilled in the art. Preferred initiators include benzoyl peroxide, tertiarybutylperbenzoate, and tertiaryamyl 2-ethylhexyl peroxycarbonate. The amount of initiator in the reaction mixture is generally at least about 0.05 weight percent, typically at least about 0.1 weight percent, and frequently at least about 0.15 weight percent, based on the amount of monomer in the reaction mixture. It is preferred to use as little initiator as can be used to achieve an acceptable polymerization yield. Generally, the amount of initiator in the reaction mixture is about 0.6 weight percent or less, typically about 0.55 weight percent or less, and frequently about 0.5 weight percent or less.

The reaction mixture may also contain one or more non-styrenic monomers copolymerizable with styrenic monomers. Preferred non-styrenic monomers include acrylic and methacrylic esters such as, for example, methyl acrylate, ethyl acrylate, butyl acrylate, methyl methacrylate, ethyl methacrylate; acrylonitrile; and vinyl monomers such as divinyl benzene. The amount of non-styrenic monomer is preferably about 98 weight percent or less, more preferably about 75 weight percent or less, more preferably about 50 weight percent or less.

The reaction mixture is preferably heated to an appropriate polymerization temperature for the styrenic monomers before being combined with the seed suspension. The appropriate temperature is also dependent, in part, upon the amount and composition of initiators present. For example, if benzoyl peroxide is used as an initiator, the appropriate polymerization temperature for styrenic monomers is generally from about 80° C. to about 95° C. If desired, a second initiator having a higher activation temperature may be used, and the temperature of the reaction mixture may be increased after the polymerization reaction is mostly complete, such as, for example, about 85 percent complete, to a higher temperature referred to as the "finishing temperature". The second initiator may be included in the reaction mixture when the mixture is prepared, or may be added after the polymerization reaction has started. For styrenic monomers with tertiary amyl 2-ethylhexyl peroxycarbonate (TAEC) initiator, the finishing temperature is preferably from about 114° C. to about 118° C. For styrenic monomers with tertiarybutylperbenzoate initiator, the finishing temperature is preferably from about 123° C. to about 129° C.

In preferred embodiments, the seed suspension is placed into a reactor and the reaction mixture is added to the seed suspension. Also preferably, the reaction mixture is added to the seed suspension gradually. Gradual addition of the reaction mixture to the seed suspension can be accomplished by pumping, such as, for example, using a metered pump, or other controlled method.

Alternatively, an aliquot of reaction mixture can be added batchwise to the seed suspension intermittently, such as, for example, every 30 minutes. Each aliquot is preferably added over about 5 to 10 minutes. The amount of reaction mixture in each aliquot will depend, in part, on the quantity of seeds in the reactor. Typically, a weight of reaction mixture equal to about ¼ the weight of seeds in the reactor can be added to the reactor over about a 30 minute period.

In preferred embodiments, the reaction mixture or the seeds contain one or more blowing agents. The term "blowing agent", as used herein, means a substance capable of inducing expansion or foaming of a polymeric material. Blowing agents are included when the polymer is to be expanded. For example, expanded polystyrene can be formed using polystyrene that has been formed by polymerization of monomers in the presence of a blowing agent. Alternatively, if desired, a blowing agent can be imbibed by the polymer after polymerization is complete. Preferred blowing agents have boiling points below the softening point of the styrenic polymer formed, and are in the gaseous or liquid state at ordinary room temperatures (about 20–28 degrees C). Also preferably, the blowing agent is only partially soluble in the polymer formed. However, the blowing agent may be capable of being absorbed by the polymer. Suitable blowing agents include hydrocarbons and halogenated hydrocarbons such as, for example, propane, butane, normal pentane, isopentane, heptane, hexanes including isohexane, propylene, butylene, neopentane, 1-pentene, cyclobutane, cyclopentane, and difluoromethane. Surprisingly, blowing agents are preferably added early in the polymerization phase, in order to obtain the most preferable EPS. Late addition of the blowing agents may result in EPS with poor cell size.

It is generally known that blowing agents can be added at any time during suspension-based seed polymerization, resulting in EPS of acceptable quality. In the present invention, the use of emulsion based seeds prefers that some or all of the blowing agent be added before the reaction conversion reaches 50%, although the blowing agent can be added as late as 70% with some cell size benefit. One or more blowing agents can be dissolved in the styrenic monomers prior to combination of the monomers with the seed suspension, and it is believed that dissolution of the blowing agent in the styrenic monomers provides for improved dispersion of the blowing agent in the polymer as compared to addition of the blowing agent to the reactor after combination of the monomers with the seed suspension. The improved dispersion of the blowing agent in the polymer may improve performance of the polymer during use in some applications. Alternatively, blowing agents can be added to the reactor separately at any time.

In some embodiments, a portion of the blowing agent can be dissolved in the styrenic monomers and a portion can be added to the reactor separately. Selection of the preferred manner of adding the blowing agent may be readily accomplished by one skilled in the art. Generally, the earlier in the process of the reaction the blowing agent is added, the slower the reaction will proceed and the lower will be the molecular weight of the polymer. However, the inventors have discovered that one or more blowing agents can be added to the seed suspension and the suspension containing the blowing agent maintained at a temperature of about 180° F. to about 220° F. for several hours, e.g., 2, 3, or 4 hours. Preferably the seed suspension is then allowed to reach the desired reaction temperature, including cooling or heating as necessary, and the reaction mixture and optional pre-swell mixture are then combined with the seed mixture. While it is not intended that the invention be bound by any particular theory, it is believed that maintaining the seed suspension and blowing agent at an elevated temperature for several hours allows the blowing agent to impregnate the seeds and provides for an increased reaction rate later on. Polymeric seeds impregnated by a blowing agent can be referred to as "expandable" polymeric seeds. Expandable polymeric seeds can be used in the processes disclosed herein, in place of conventional polymeric seeds.

For applications requiring an expanded polymer, polymer having a blowing agent dispersed therein can be stored until needed, and expanded by heating to a temperature above the boiling point of the blowing agent and above the glass transition temperature ($T_g$) of the polymer containing the blowing agent.

In some embodiments, a pre-swelling mixture is also used and can further reduce the production of undesirable fines. The term "pre-swelling" is not intended to imply a specific degree of increase in the size or volume of any polymer or other material. However, while it is not intended that the reaction be bound by any particular theory, it is believed that when a pre-swelling mixture is used, some initiator is absorbed by the seeds in the presence of the pre-swelling mixture. In embodiments in which a pre-swelling mixture is used, the pre-swelling mixture may be added to the seed suspension, preferably at a temperature below the desired polymerization temperature for the monomers. The pre-swelling temperature is selected, in part, based on the activation temperature for the polymerization initiator, and is selected to minimize initiator decomposition. The pre-swelling temperature is typically less than about 80° C., and frequently about 70° C. or less. Also typically, the pre-swelling temperature is at least about 40° C. Alternatively, the pre-swelling mixture may be heated to approximately the polymerization temperature for the styrenic monomers prior to adding the reaction mixture and the seed suspension.

The optional pre-swelling mixture includes one or more styrenic monomers and one or more initiators. Suitable initiators can be selected by one skilled in the art and include acyl peroxides such as benzoyl peroxide, alkyl peroxides such as cumyl and t-butyl peroxides, hydroperoxides such as cumyl and t-butyl hydroperoxides, peresters such as t-butyl benzoate, and azo compounds such as 2,2'-azobisisobutyronitrile. Peroxide initiators are preferred, such as benzoyl peroxide, lauroyl peroxide, tert-butyl peroxybenzoate, tert-butylperoxypivalate, tert-butyl-2-ethylhexyl peroxycarbonate, tert-amyl-2-ethylhexyl peroxycarbonate, and dicumyl peroxide.

When the pre-swelling mixture is used, it is preferred that at least about 6 weight percent of the total amount of initiator to be used in the reaction is in the pre-swelling mixture, thus reducing the amount of initiator that is in the reaction mixture. The amount of initiator in the pre-swelling mixture is preferably at least about 0.1 weight percent, more preferably at least about 0.15 weight percent, even more preferably at least about 0.2 weight percent, even more preferably at least about 0.25 weight percent, and still even more preferably at least about 0.3 weight percent, based on the amount of monomer in the pre-swelling mixture. Also preferably, the amount of initiator is about 5 weight percent or less, more preferably about 4.5 weight percent or less, still more preferably about 4 weight percent or less, even more preferably about 3.5 weight percent or less, still even more preferably about 3 weight percent or less. In some highly preferred embodiments, the amount of initiator is from about 0.3 to about 2.5 weight percent, especially about 2, 2.1 or 2.2 weight percent. While it is not intended that the invention be bound by any particular theory, it is believed that contacting the seeds with a solution of initiator in monomer at a temperature below the polymerization temperature results in a reduced amount of initiator in the aqueous component of the seed suspension, which in turn contributes to the observed reduction of fines.

When the target temperature for the pre-swelling mixture has been reached, the pre-swelling mixture is added to a reaction vessel containing seeds, suspension agent and surfactant. Preferably, the pre-swelling mixture is added to the reaction vessel by pumping, and preferably a meter or other control is used so that the pre-swelling mixture can be added to the seed suspension at a desired rate.

The amount of pre-swelling mixture can be up to about 300 weight percent, preferably up to about 250 weight percent, based on the weight of the seeds contained in the seed suspension. Preferably, the amount of pre-swelling mixture is at least about 8 weight percent, more preferably about 10 weight percent, still more preferably at least about 15 weight percent. However, any amount of pre-swelling mixture up to about 300 weight percent can be used, such as for example, 20, 30, 40, 50, 60, 70, 80, 90 or 100 weight percent, and in some embodiments even 150, 175, or 200 weight percent or more. The upper limit of the amount of pre-swelling mixture in relation to the seeds is determined, in part, by the solubility of the seeds in the pre-swelling mixture. That is, the amount of pre-swelling mixture should be less than that which would dissolve the seeds. When the amount of pre-swelling mixture used is less than about 30 percent the total weight of seeds, the mixture can be added to the reaction vessel in about 10 minutes or less. When the amount of pre-swelling mixture used is about 300 weight percent of the weight of seeds, the mixture can be added to the reaction vessel in about 90 minutes or less. The time required to add the pre-swelling mixture to the reaction vessel can be readily determined by one skilled in the art and will depend, in part, upon the capacity of the equipment, such as a pump, used in making the addition, in part on the properties of the seeds, the concentration of the seeds, and in part upon the ability of the suspension to remain stable during the addition.

The term "swelling" as used herein, including as used with respect to "pre-swelling", is not intended to imply any mechanism, but refers only to an increase in size of the polymeric seeds and/or growth in size of a polymeric particle. While it is not intended that the invention be bound by any particular theory, it is believed that the uniformity of particle size increase of a polymeric seed depends, in part, upon an appropriate balance between the rate at which the reaction mixture, aqueous suspension, and optional pre-swelling solution are combined, and the rate of polymerization. For example, if the reaction mixture and the seed suspension are combined too rapidly with respect to the reaction rate, the seed may become "sticky", and may become soluble in the monomer. Stickiness may be reduced or avoided by ensuring that some initiator is present in the reactor at all times, up to and including at the time of completion of polymerization. Samples may be removed from the reactor during polymerization and seeds examined for stickiness and if stickiness is observed, the addition of the seed suspension can be temporarily stopped and the reaction allowed to proceed. If necessary, initiator can be added as the reaction progresses.

The rate of combination of the reaction mixture with the seed suspension can be controlled, for example, by using a pump. As mentioned, preferably the reaction mixture is added to the seed suspension, the seed suspension having been placed into a reaction vessel. When a pre-swelling mixture is used, the pre-swelling mixture is placed into the reaction vessel, containing the seed suspension, and the reaction mixture is then added. The rate of pumping the reaction mixture into the reactor can be varied intermittently. Such variation can include temporarily halting pumping or decreasing the rate. A regular pattern of variation can be referred to as a "profile", for example, a pump profile. A pump profile would result if a graphic representation were made of pumping rate as a function of time. For example, a suitable pump profile may resemble stairs, and may be referred to as a "step" profile. Other suitable pump profiles include linear profiles and "second order profiles", wherein a graphic representation of pump rate as a function of time would approximate a plot of a second-order mathematical function; regular batch additions of reaction mixture; and power law function profiles. In some embodiments, an external control such as a computer program may be used to control the pump rate, and the program may include parameters such as the amount of monomer theoretically present in the reactor at a given time. A feedback apparatus, such as a flow meter, may be used to help in controlling the rate of pumping the mixtures into the reactor. Generally, it is preferred that the amount of monomer in the reactor be about 30 weight percent or less, based on the total weight of the monomer plus polymer, including original polymeric seed plus any polymer formed during reaction, in the reactor, substantially throughout the reaction until all of the monomer has been added to the reactor. More preferably, the amount of monomer is about 20 weight percent or less.

Additives that may be present in the reaction mixture include waxes. The use of waxes in polymerization processes is known to those skilled in the art. Suitable waxes for use in the processes of the invention include microcrystalline waxes and Fisher-Tropsch waxes having appropriate melting points. It has been discovered that some waxes, when added in particulate form, may form regions of wax that are larger in volume than the initial size of individual wax particles. The formation of large regions of wax may be undesirable for some applications. While it is not intended that the invention be bound by any particular theory, it is believed that waxes may provide nucleation sites for the formation of cells when the polymer includes a blowing agent and is later expanded. It was difficult to incorporate waxes into emulsion based seeds or swelling particles to improve cell size control.

The polymerization reaction may be characterized in terms of yield. In particular, the "prime yield" may be determined. The prime yield is the yield of particles having average diameters within a preferred size range, which size range is chosen depending upon the intended application for the polymer. Preferably the prime yield is about 90% or more, more preferably about 93% or more, still more preferably about 95% or more, even more preferably about 97% or more and still even more preferably about 99% or more. For example, it has been observed that styrenic seed particles having average diameters from about 213 to about 284 microns can yield expanded polystyrene particles having an average diameter of about 394 microns, with 95% of the particles having average diameters from about 341 to about 447 microns. The prime yield will depend upon a wide variety of parameters including reaction rate, reaction temperature, amount of initiator, size distribution of seeds, rate of combination of monomer with seeds, suspension stability, and the amount of monomer present during the reaction. Generally, the particle size distribution of the seeds and the balance between the rate of addition of monomer to seeds and the polymerization rate will have the greatest effect on the particle size distribution of the final product.

As mentioned, it is desirable that the amount of fines produced during polymerization be minimized. It has been observed that the processes disclosed herein frequently result in about 2 weight percent fines or less, based on the polymer yield, and in some cases the amount of fines produced is too small to be accurately measured.

EXAMPLES

The following examples are merely illustrative of the present invention and should not be considered as limiting the scope of the invention in any way. Examples 1 through 14, 17 and 34–39 are actual examples, and the remainder are prophetic examples.

All benzoyl peroxide initiator used in these examples is 75% active.

Example 1

To a 100 gallon reaction vessel equipped with an agitator were added 435 lbs of deionized (DI) water, 81 lbs of 229.1 micron polystyrene, emulsion based seeds (Dypro™), 1816 grams tricalcium phosphate (TCP), 10.4 grams Nacconal sodium dodecyl benzene sulfonate (available from Stepan Co.) and 12 grams Foamaster O anti-foam agent (available from Henkel Corp., Ambler, Pa.) to form a seed suspension.

To a 250 gallon vessel (designated the reaction mixture vessel) with a bottom discharge to the reaction mixture pump were added 307 lbs styrene, 208.9 grams of 75% active benzoyl peroxide (BPO) (1500 ppm based on styrene), 612.7 grams tertiaryamyl 2-ethylhexyl peroxycarbonate (TAEC) (4400 ppm based on styrene), 723.5 grams PW 1000 T-6 brand microcrystalline polyethylene wax from Petrolite (0.5% based on styrene) and 30.1 lbs normal pentane, to form a reaction mixture.

To a 10-liter open vessel (designated the pre-swelling mixture vessel, "PMV") were added 12 lbs styrene (15% of the weight of seeds) and 14.2 grams BPO (2600 ppm based on styrene in PMV). The open vessel was heated to 40° C. At 40° C. the contents of the PMV were added to the reaction vessel via a pump over a 10 minute period, to form a pre-swelling mixture. The temperature was held at 40° C. for 50 minutes.

The reaction vessel was heated to 85° C. and held at 85° C. for 30 minutes. The following were added to the reaction vessel: 5 lbs DI water, 454 grams TCP, 97 grams Triton X-102 surfactant and 57 grams Triton X-305 surfactant. The reaction vessel was sealed and purged with nitrogen, then pressurized with 5 psi of nitrogen. The main reaction mixture was added to the reaction vessel according to the schedule in the following table:

TABLE 1

PROGRAM FOR ADDITION OF REACTION MIXTURE TO REACTION VESSEL

| Time | Pump Rate (lbs/min) |
| --- | --- |
| Hour 0 to 1 | 0.61 |
| Hour 1 to 2 | 1.21 |
| Hour 2 to 3 | 1.21 |
| Hour 3 to 4 | 2.0 |
| Hour 4 to 5 | 2.0 |

When all of the reaction mixture had been added to the reaction vessel, the reaction vessel was heated to 238° F. (114° C.) and held for 7 hours. The reaction vessel was then cooled to 105° F. (40° C.) and the contents were transferred to a holding tank. The contents were acidified to a pH of 1.8 and dried. EPS made by this method had small, uniform cells.

Example 2

To a 100 gallon reaction vessel equipped with an agitator were added 435 lbs of deionized (DI) water, 81 lbs of 229.1 micron emulsion based, polystyrene seeds (Dypro™), 1816 grams tricalcium phosphate (TCP), 10.4 grams sodium dodecyl benzene sulfonate and 12 grams Foamaster O anti-foam agent, to form a seed suspension.

To a 250 gallon reaction mixture vessel with a bottom discharge to the reaction mixture pump were added 307 lbs styrene, 208.9 grams (BPO) (1500 ppm based on styrene), 612.7 grams tertiaryamyl 2-ethylhexyl peroxycarbonate (TAEC) (4400 ppm based on styrene), and 723.5 grams PW 1000 T-6 brand microcrystalline polyethylene wax from Petrolite (0.5% based on styrene), to form a reaction mixture.

To the PMV were added 12 lbs styrene (15% of the weight of seeds) and 14.2 grams BPO (2600 ppm based on styrene in PMV). The reactor was heated to 40° C. At 40° C. the contents of the PMV were added to the reaction vessel via a pump over a 10 minute period, to form a pre-swelling mixture. The temperature was held at 40° C. for 50 minutes.

The reaction vessel was heated to 85° C. and held at 85° C. for 30 minutes. 99 pounds of the reaction mixture were pumped into the reaction vessel, then the pump was shut off. The following were then added to the reaction vessel: 5 lbs DI water, 454 grams TCP, 97 grams Triton X-102 surfactant and 57 grams Triton X-305 surfactant. The reaction vessel was sealed and purged with nitrogen, then pressurized with 5 psi of nitrogen, then 30.1 pounds of pentane were added to the reaction mixture vessel. The remainder of the reaction mixture was added to the reaction vessel according to the schedule in the following table:

TABLE 2

PROGRAM FOR ADDITION OF REACTION MIXTURE TO REACTION VESSEL

| Time | Pump Rate (lbs/min) |
| --- | --- |
| Hour 0 to 1 | 0.61 |
| Hour 1 to 2 | 1.21 |
| Hour 2 to 3 | 1.21 |
| Hour 3 to 4 | 2.0 |
| Hour 4 to 5 | 2.0 |

After all of the reaction mixture was added to the reaction vessel, the reaction vessel was heated to 238° F. and held for seven (7) hours. The reaction vessel was then cooled to 105° F. (40° C.) and the contents were transferred to a holding tank. The contents were acidified to a pH of 1.8 and dried. This method yielded acceptable EPS but with more variable cell size distribution.

Example 3

To a 100 gallon reaction vessel equipped with an agitator were added 435 lbs of deionized (DI) water, 81 lbs of 229.1 micron emulsion based, polystyrene seeds (Dypro™), 1816 grams tricalcium phosphate (TCP), 10.4 grams sodium dodecyl benzene sulfonate and 12 grams Foamaster O anti-foam agent to form a seed suspension.

To a 250 gallon reaction mixture vessel with a bottom discharge to the reaction mixture pump were added 307 lbs styrene, 208.9 grams (BPO) (1500 ppm based on styrene), 612.7 grams tertiaryamyl 2-ethylhexyl peroxycarbonate (TAEC) (4400 ppm based on styrene), and 723.5 grams PW 1000 T-6 brand microcrystalline polyethylene from Petrolite (0.5% based on styrene), to form a reaction mixture.

To the PMV were added 12 lbs styrene (15% of the weight of seeds) and 14.2 grams BPO (2600 ppm based on styrene in PMV). The reactor was heated to 40° C. At 40° C. the contents of the PMV were added to the reaction vessel via a pump over a 10 minute period, to form a pre-swelling mixture. The temperature was held at 40° C. for 50 minutes.

The reaction vessel was heated to 85° C. and held at 85° C. for 30 minutes. 198 pounds of the reaction mixture were pumped into the reaction vessel according to the schedule in the following table:

TABLE 3

PROGRAM FOR ADDITION OF REACTION MIXTURE TO REACTION VESSEL

| Time | Pump Rate (lbs/min) |
| --- | --- |
| Hour 0 to 1 | 0.61 |
| Hour 1 to 2 | 1.21 |
| Hour 2 to 3 | 1.21 |
| Hour 3 to 4 | 2.0 |
| Hour 4 to 5 | 2.0 |

The pump was shut off, and the following were then added to the reaction vessel: 5 lbs DI water, 454 grams TCP, 97 grams Triton X-102 surfactant and 57 grams Triton X-305 surfactant. The reaction vessel was sealed and purged with nitrogen, then pressurized with 5 psi of nitrogen. 30.1 pounds of pentane were added to the reaction mixture vessel, then the remainder of the reaction mixture was added to the reaction vessel according to the schedule in Table 3. This method yielded EPS with variable and many times unacceptable cell size distribution.

After all of the reaction mixture was added to the reaction vessel, the reaction vessel was heated to 238° F. and held for seven (7) hours. The reaction vessel was then cooled to 105° F. (40° C.) and the contents were transferred to a holding tank. The contents were acidified to a pH of 1.8 and dried.

Example 4

To a 100 gallon reaction vessel equipped with an agitator were added 435 lbs of deionized (DI) water, 81 lbs of 229.1 micron emulsion based, polystyrene seeds (Dypro™), 1816 grams tricalcium phosphate (TCP), 10.4 grams sodium dodecyl benzene sulfonate and 12 grams Foamaster O anti-foam agent, to form a seed suspension.

To a 250 gallon reaction mixture vessel with a bottom discharge to the reaction mixture pump were added 307 lbs styrene, 208.9 grams BPO (1500 ppm based on styrene), 612.7 grams tertiaryamyl 2-ethylhexyl peroxycarbonate (TAEC) (4400 ppm based on styrene), and 723.5 grams PW 1000 T-6 brand microcrystalline polyethylene wax from Petrolite (0.5% based on styrene), to form a reaction mixture.

To the PMV were added 12 lbs styrene (15% of the weight of seeds) and 14.2 grams BPO (2600 ppm based on styrene in PMV). The reactor was heated to 40° C. At 40° C. the contents of the PMV were added to the reaction vessel via a pump over a 10 minute period, to form a pre-swelling mixture. The temperature was held at 40° C. for 50 minutes.

The reaction vessel was heated to 85° C. and held at 85° C. for 30 minutes, and the reaction mixture was pumped into the reaction vessel according to the schedule in the following table:

TABLE 4

PROGRAM FOR ADDITION OF REACTION MIXTURE TO
Reaction vessel

| Time | Pump Rate (lbs/min) |
| --- | --- |
| Hour 0 to 1 | 0.61 |
| Hour 1 to 2 | 1.21 |
| Hour 2 to 3 | 1.21 |
| Hour 3 to 4 | 2.0 |
| Hour 4 to 5 | 2.0 |

The pump was shut off, and the following were then added to the reaction vessel: 5 lbs DI water, 454 grams TCP, 97 grams Triton X-102 surfactant and 57 grams Triton X-305 surfactant. The reaction vessel was sealed and purged with nitrogen, then pressurized with 5 psi of nitrogen.

After all of the reaction mixture was added to the reaction vessel, the reaction vessel was heated to 238° F. and held for 1.5 hours. The reaction vessel was then cooled to 220° F. (104° C.) and 30.1 pounds of pentane were added to the reaction vessel over 45 minutes. Once all of the pentane was added, the reaction vessel was held at 220° F. for 3 hours, then cooled to 40° C. The product was acidified to a pH of 1.8 and then cooled. This method yielded EPS with unacceptable cell size distribution. Many expanded particles were hollow and most had only a few cells.

Example 5

To a 100 gallon reaction vessel equipped with an agitator were added 440 lbs of deionized (DI) water, 81 lbs of 229.1 micron polystyrene seeds, 2270 grams tricalcium phosphate (TCP), 13 grams sodium dodecyl benzene sulfonate, 12 grams Foamaster O anti-foam agent, 97 grams of Triton X-102 surfactant and 57 grams Triton X-305 surfactant to form a seed suspension.

To a 250 gallon reaction mixture vessel were added 319 lbs styrene, 260.5 grams BPO (1800 ppm based on styrene), and 289.4 grams tertiaryamyl 2-ethylhexyl peroxycarbonate (TAEC) (2000 ppm based on styrene), to form a reaction mixture. 30.1 pounds of normal pentane were placed into a pressure-rated vessel above the reaction vessel.

The reaction vessel was heated to 185° F. While heating, 12 pounds of the reaction mixture were added to the reaction vessel at a rate of 2.0 lbs/minute. After the initial 12 pounds of reaction mixture was added to the reaction vessel and the temperature had reached 185° F., the temperature was held for one hour. After one hour at 185° F., the reaction vessel was pressurized to 5 psig nitrogen. The remaining reaction mixture was added according to the schedule in the table below:

TABLE 5

PROGRAM FOR ADDITION OF REACTION MIXTURE TO
Reaction vessel

| Hour | lbs/min | lbs/hour |
| --- | --- | --- |
| 0 | 0.89 | 53.4 |
| 1 | 1.31 | 78.6 |
| 2 | 1.60 | 96 |
| 3 | 1.60 | 96 |

The pentane (4.3 pounds) was added simultaneously with the reaction mixture over about 7 minutes. The addition of the reaction mixture took about 3 hours 50 minutes.

After the reaction mixture and pentane were added to the reaction vessel, the reaction vessel was heated to 238° F. and held for 1.5 hours. The reaction vessel was then cooled to 220° F. During the cooldown, from 238° F. to 220° F., additional pentane (25.8 pounds) was added to the reaction vessel at a rate of 0.43 pounds per minute. When the temperature reached 220° F., the temperature was maintained for 3 hours. After 3 hours, the reaction vessel was cooled to 95° F. The contents were transferred to a holding tank, acidified to pH 1.8 and dried. This method yielded EPS of unacceptable cell structure.

Example 6

Example 5 was repeated, except that 8.6 pounds of n-pentane were added after the initial addition of styrene to the reaction vessel, and the remainder of the pentane was added after the reaction mixture had been added, during the cooldown to 220° F.

Example 7

Example 5 was repeated, except that 12.9 pounds of n-pentane were added after the initial addition of styrene to the reaction vessel, and the remainder of the pentane was added after the reaction mixture had been added, during the cooldown to 220° F.

Example 8

Example 5 was repeated, except that 81 pounds of the reaction mixture were added to the reaction vessel during the initial addition of styrene to the reaction vessel.

Example 9

Example 5 was repeated, except that 200 pounds of the reaction mixture were added to the reaction vessel during the initial addition of styrene to the reaction vessel.

Example 10

Example 6 was repeated, except that 81 pounds of the reaction mixture were added to the reaction vessel during the initial addition of styrene to the reaction vessel.

Example 11

Example 6 was repeated, except that 200 pounds of the reaction mixture were added to the reaction vessel during the initial addition of styrene to the reaction vessel.

Example 12

Example 7 was repeated, except that 81 pounds of the reaction mixture were added to the reaction vessel during the initial addition of styrene to the reaction vessel.

Example 13

Example 7 was repeated, except that 200 pounds of the reaction mixture were added to the reaction vessel during the initial addition of styrene to the reaction vessel.

Example 14

Example 1 was repeated, except that a mix of 30 weight % isopentane and 70 weight % normal pentane was used in place of 100% normal pentane.

Example 15

Example 2 was repeated, except that a mix of 30 weight % isopentane and 70 weight % normal pentane was used in place of normal pentane.

Example 16

Example 3 was repeated, except that a mix of 30 weight % isopentane and 70 weight % normal pentane was used in place of normal pentane.

Example 17

Example 4 was repeated, except that a mix of 30 weight % isopentane and 70 weight % normal pentane was used in place of 100% normal pentane.

Example 18

Example 6 was repeated, except that a mix of 30 weight % isopentane and 70 weight % normal pentane was used in place of normal pentane.

Example 19

Example 7 was repeated, except that a mix of 30 weight % isopentane and 70 weight % normal pentane was used in place of normal pentane.

Example 20

Example 8 was repeated, except that a mix of 30 weight % isopentane and 70 weight % normal pentane was used in place of normal pentane.

Example 21

Example 9 was repeated, except that a mix of 30 weight % isopentane and 70 weight % normal pentane was used in place of normal pentane.

Example 22

Example 10 was repeated, except that a mix of 30 weight % isopentane and 70 weight % normal pentane was used in place of normal pentane.

Example 23

Example 11 was repeated, except that a mix of 30 weight % isopentane and 70 weight % normal pentane was used in place of normal pentane.

Example 24

Example 12 was repeated, except that a mix of 30 weight % isopentane and 70 weight % normal pentane was used in place of normal pentane.

Example 25

Example 1 was repeated, except that the PW 1000 T-6 was dissolved in 1000 ml of hot styrene before being introduced into the reaction mixture.

Example 26

Example 1 was repeated, except that the PW 1000 T-6 was dissolved in 1000 ml of hot styrene and added directly to the reaction vessel at the 85° C. reaction temperature.

Example 27

Example 1 was repeated, except that the reaction mixture included 1.0 weight % of methyl methacrylate.

Example 28

Example 1 was repeated, except that the styrene in the PMV was replaced by methyl methacrylate.

Example 29

Example 27 was repeated, except that the styrene in the reaction mixture was replaced by methyl methacrylate.

Example 30

Example 2 was repeated, except that the PW1000 T-6 was replaced by PW 655 T-10.

Example 31

Example 2 was repeated, except that the PW1000 T-6 was replaced by Paraflint 40.

Example 32

Example 1 was repeated, except that TAEC was replaced by TBP, and the reaction vessel was heated to 255° F. The reaction mixture was held at 255° F. to reduce residual styrene monomer to an acceptable level.

Example 33

Example 1 was repeated, except the seeds were expanded polystyrene seeds. The reaction pressure was maintained sufficiently high during all phases of the reaction to prevent the expanded polystyrene seeds from further expanding.

Example 34

Example 1 was repeated, except that some of the pentane was added to the seeds and the seeds and pentane were maintained at 195° F. for 2 hours before the seeds were combined with the other reaction components.

Example 35

Example 1 was repeated, except the seeds were suspension based seeds. EPS cell structure was acceptable.

Example 36

Example 2 was repeated, except the seeds were suspension based seeds. EPS cell structure was acceptable.

Example 37

Example 3 was repeated, except the seeds were suspension based seeds. EPS cell structure was acceptable.

Example 38

Example 4 was repeated, except the seeds were suspension based seeds. EPS cell structure was acceptable.

Example 39

Example 5 was repeated, except the seeds were suspension based seeds. EPS cell structure was acceptable.

In summary, Examples 8–13 and 16–24 yielded EPS of unacceptable cell structure. Examples 14–15 and 25–39 made EPS of acceptable cell structure.

In any of the preceding examples, all or part of the styrene monomer can be replaced by other styrenic monomers and/or non-styrenic monomers. Also, substitutions can be made for the microcrystalline polyethylene wax. Furthermore, isopentane and/or other isomers of pentane can replace all or part of normal pentane, and the time and rate of addition of the reaction mixture and/or the pre-swelling mixture to the reaction vessel can be varied.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A method for impregnating emulsion based seeds, comprising:
    a) providing polymeric, emulsion based seeds in an aqueous medium;
    b) combining with said polymeric, emulsion based seeds, in said aqueous medium, a suspending agent and one or more surfactants in a ratio of about 1:175 or less to the weight of suspending agent, to form a seed suspension;
    c) forming about 100 to about 2500 weight percent, based on the weight of the styrene polymer in the seed suspension, of a reaction mixture including styrene and one or more initiators;
    d) combining said reaction mixture with said seed suspension in the presence of one or more blowing agents to form a polymerization mixture; and
    e) heating said polymerization mixture to a polymerization temperature to effect formation of said styrenic polymer.

2. The method of claim 1 wherein said aqueous medium comprising said polymeric, emulsion based seeds, prior to said combining steps, comprise from about 4 to about 50 weight percent of said polystyrene seeds, based on the total weight of said aqueous medium.

3. The method of claim 1 wherein said aqueous medium comprising said polymeric, emulsion based seeds comprises an inorganic suspending agent.

4. The method of claim 3 wherein said inorganic suspending agent is selected from the group consisting of magnesium pyrophosphate, tricalcium phosphate, and trisodium phosphate.

5. The method of claim 1 wherein said surfactant comprises sodium dodecyl benzene sulfonate.

6. The method of claim 1 wherein said polymeric, emulsion based seeds have an average diameter of at least about 100 microns.

7. The method of claim 1 wherein said polymeric, emulsion based seeds have an average diameter of about 1000 microns or less.

8. The method of claim 1 wherein said initiator is selected from the group consisting of peroxides and azo compounds.

9. The method of claim 8 wherein said peroxide is selected from the group consisting of benzoyl peroxide, lauroyl peroxide, tert-butyl peroxybenzoate, tert-butylperoxypivalate, tert-butyl-2-ethylhexyl peroxycarbonate, tert-amyl-2-ethylhexyl peroxycarbonate, and dicumyl peroxide.

10. The method of claim 1 wherein said reaction mixture further comprises one or more additional styrenic monomers.

11. The method of claim 10 wherein said additional styrenic monomer is selected from the group consisting of alpha methyl styrene, para methyl styrene, monochlorostyrene, and dichlorostyrene.

12. The method of claim 1 wherein said blowing agent is selected from the group consisting of normal pentane, isopentane, cyclopentane, propane, butane, isohexane and heptane.

13. The method of claim 1, wherein said blowing agent is dissolved in said styrenic monomers.

14. The method of claim 1, wherein said blowing agent is added to said reaction mixture.

15. The method of claim 1, wherein said blowing agent is added to said seed suspension.

16. A method for forming an expandable styrenic polymer, comprising:
    a) providing emulsion based polymeric seeds in an aqueous medium;
    b) combining with said emulsion based polymeric seeds, in said aqueous medium, a suspending agent and one or more surfactants in a ratio of about 1:175 or less to the weight of suspending agent, to form a seed mixture;
    c) forming about 100 to about 2500 weight percent, based on the weight of the seeds in the seed mixture, of a reaction mixture including styrene and one or more initiators;
    d) combining said reaction mixture with said seed mixture to form a polymerization mixture;
    e) heating said polymerization mixture to a polymerization temperature to effect formation of said styrenic polymer; and
    f) adding a blowing agent to the styrenic polymer.

17. A method for forming an expanded styrenic polymer, comprising expanding a styrenic polymer formed according to the method of claim 16.

* * * * *